(12) United States Patent
Wingard et al.

(10) Patent No.: US 7,194,566 B2
(45) Date of Patent: Mar. 20, 2007

(54) COMMUNICATION SYSTEM AND METHOD WITH CONFIGURABLE POSTING POINTS

(75) Inventors: Drew Eric Wingard, San Carlos, CA (US); Chien-Chun Chou, San Jose, CA (US); Nabil N. Masri, Sunnyvale, CA (US); Thomas Wayne O'Connell, San Jose, CA (US); Jay Scott Tomlinson, San Jose, CA (US); Wolf-Dietrich Weber, San Jose, CA (US)

(73) Assignee: Sonics, Inc., Mountain View, CA (US)

( * ) Notice: Subject to any disclaimer, the term of this patent is extended or adjusted under 35 U.S.C. 154(b) by 672 days.

(21) Appl. No.: 10/138,284

(22) Filed: May 3, 2002

(65) Prior Publication Data

US 2003/0208553 A1 Nov. 6, 2003

(51) Int. Cl.
*H06F 13/36* (2006.01)

(52) U.S. Cl. .............. 710/310; 709/238; 709/249; 710/311; 370/359

(58) Field of Classification Search .............. 709/220, 709/225, 227, 250, 238, 249; 370/759, 389, 370/235, 359; 710/310, 311, 305, 306, 39
See application file for complete search history.

(56) References Cited

U.S. PATENT DOCUMENTS

| | | |
|---|---|---|
| 5,923,860 A | 7/1999 | Olarig |
| 5,948,089 A | 9/1999 | Wingard et al. |
| 5,987,541 A | 11/1999 | Hewitt |
| 6,034,542 A | 3/2000 | Ridgeway |
| 6,041,400 A | 3/2000 | Ozcelik et al. |
| 6,061,730 A | 5/2000 | Billings |
| 6,122,664 A | 9/2000 | Boukobza et al. |
| 6,182,183 B1 | 1/2001 | Wingard et al. |
| 6,253,243 B1 | 6/2001 | Spencer |
| 6,330,225 B1 | 12/2001 | Weber et al. |
| 6,336,138 B1 | 1/2002 | Caswell et al. |
| 6,539,225 B1 | 3/2003 | Lee |
| 6,549,516 B1 | 4/2003 | Albert et al. |
| 6,571,286 B2 | 5/2003 | Fisher et al. |
| 6,578,117 B2 | 6/2003 | Weber |
| 6,654,798 B1 | 11/2003 | Skibinski et al. |
| 6,671,724 B1 | 12/2003 | Pandya et al. |
| 6,683,474 B2 | 1/2004 | Ebert et al. |
| 6,718,416 B1 | 4/2004 | Self et al. |
| 6,721,793 B1 | 4/2004 | Corless |

(Continued)

FOREIGN PATENT DOCUMENTS

EP 1 376 932 A2 1/2004

(Continued)

OTHER PUBLICATIONS

PCT International Search Report, 1 page, Mailed Aug. 8, 2003.

(Continued)

*Primary Examiner*—Khanh Dinh
(74) *Attorney, Agent, or Firm*—Blakely, Sokoloff, Taylor & Zafman, LLP (57) ABSTRACT

A communication system and method with configurable posting points have been described.

63 Claims, 10 Drawing Sheets

| writeresp_enable | writechoice_enable | Master | Slave |
|---|---|---|---|
| OFF | n/a (either ON or OFF because when writeresp_enable is OFF it overrides the writechoice_enable) | Only one flavor of write can be communicated | Slave can decide whether to treat the write as posted or not, by deciding whether to accept it immediately or only after the write operation has completed |
| ON | OFF | Only one flavor of write can be communicated | Slave can decide whether to treat the write as posted or not, and where to post |
| ON | ON | Master can decide whether to send posted or non-posted writes | Slave can decide whether to treat each type of write as posted or not, and where to post |

U.S. PATENT DOCUMENTS

| | | |
|---|---|---|
| 6,725,313 B1 | 4/2004 | Wingard et al. |
| 6,766,406 B1 | 7/2004 | Gasperini et al. |
| 6,775,719 B1 * | 8/2004 | Leitner et al. ............... 710/33 |
| 6,785,256 B2 | 8/2004 | O'Neill |
| 6,785,753 B2 | 8/2004 | Weber et al. |
| 6,795,857 B1 | 9/2004 | Leung et al. |
| 6,804,738 B2 | 10/2004 | Weber |
| 6,804,757 B2 | 10/2004 | Weber |
| 6,816,814 B2 | 11/2004 | Ebert et al. |
| 6,831,916 B1 * | 12/2004 | Parthasarathy et al. ..... 370/359 |
| 6,880,133 B2 | 4/2005 | Meyer et al. |
| 6,948,004 B2 * | 9/2005 | Gasbarro et al. ........... 709/250 |
| 6,961,834 B2 | 11/2005 | Weber |
| 6,976,106 B2 | 12/2005 | Tomlinson et al. |
| 2002/0046260 A1 | 4/2002 | Day, II |
| 2002/0138287 A1 | 9/2002 | Chen et al. |
| 2002/0138615 A1 | 9/2002 | Schmeling |
| 2002/0141401 A1 | 10/2002 | Albert et al. |
| 2002/0143653 A1 | 10/2002 | DiLena et al. |
| 2002/0169854 A1 | 11/2002 | Tarnoff |
| 2002/0184300 A1 | 12/2002 | Schmeling et al. |
| 2003/0018738 A1 | 1/2003 | Boylan et al. |
| 2003/0069960 A1 | 4/2003 | Symons et al. |
| 2003/0074520 A1 | 4/2003 | Weber |
| 2003/0126192 A1 | 7/2003 | Magnussen |
| 2003/0158994 A1 * | 8/2003 | Moy .......................... 710/311 |
| 2003/0167144 A1 | 9/2003 | Wang et al. |
| 2003/0208566 A1 | 11/2003 | Weber et al. |
| 2004/0015961 A1 | 1/2004 | Chefalas et al. |

FOREIGN PATENT DOCUMENTS

| | | |
|---|---|---|
| EP | 03 72 8644 | 8/2005 |
| WO | WO 95/34153 A | 12/1995 |
| WO | WO 99/63727 | 12/1999 |
| WO | WO 02/13024 A1 | 2/2002 |

OTHER PUBLICATIONS

Hadjitheodosiou, M.H. et. al.: "Broadband Access Via Satellite," Computer Networks, Elsevier Science Publishers B. V., Amsterdam, NL, vol. 31, No. 4, Feb. 25, 1999, pp. 353-378.

* cited by examiner

| writeresp_enable | writechoice_enable | Master | Slave |
|---|---|---|---|
| OFF | n/a (either ON or OFF because when writeresp_enable is OFF it overrides the writechoice_enable) | Only one flavor of write can be communicated | Slave can decide whether to treat the write as posted or not, by deciding whether to accept it immediately or only after the write operation has completed |
| ON | OFF | Only one flavor of write can be communicated | Slave can decide whether to treat the write as posted or not, and where to post |
| ON | ON | Master can decide whether to send posted or non-posted writes | Slave can decide whether to treat each type of write as posted or not, and where to post |

COMMUNICATION SYSTEM AND METHOD WITH CONFIGURABLE POSTING POINTS

FIELD OF THE INVENTION

The present invention pertains to communication. More particularly, the present invention relates to a method and apparatus for configurable posting points in a communication system.

BACKGROUND OF THE INVENTION

In communication systems, how information is transferred from one point to another is important. Also of importance is the successful transfer of the information. Acknowledgement of receipt of the information communicated is often used to convey the successful or non-successful transfer of the information. Information may be in the form of packets, streams, reads, writes, etc.

How an acknowledgement is performed, if and when it is sent, as well as the point at which it is sent may affect system performance. For example, if an acknowledgement is only sent after the receiving end has completed the entire reception of what was transmitted, this may delay the transmitting device from sending additional information until the prior transmission is acknowledged. On the other hand, if the transmitter sends information without regard to whether the receiver has actually received the information may also present problems in the communication system.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for configurable posting points in a communication system are described.

Figure 1:
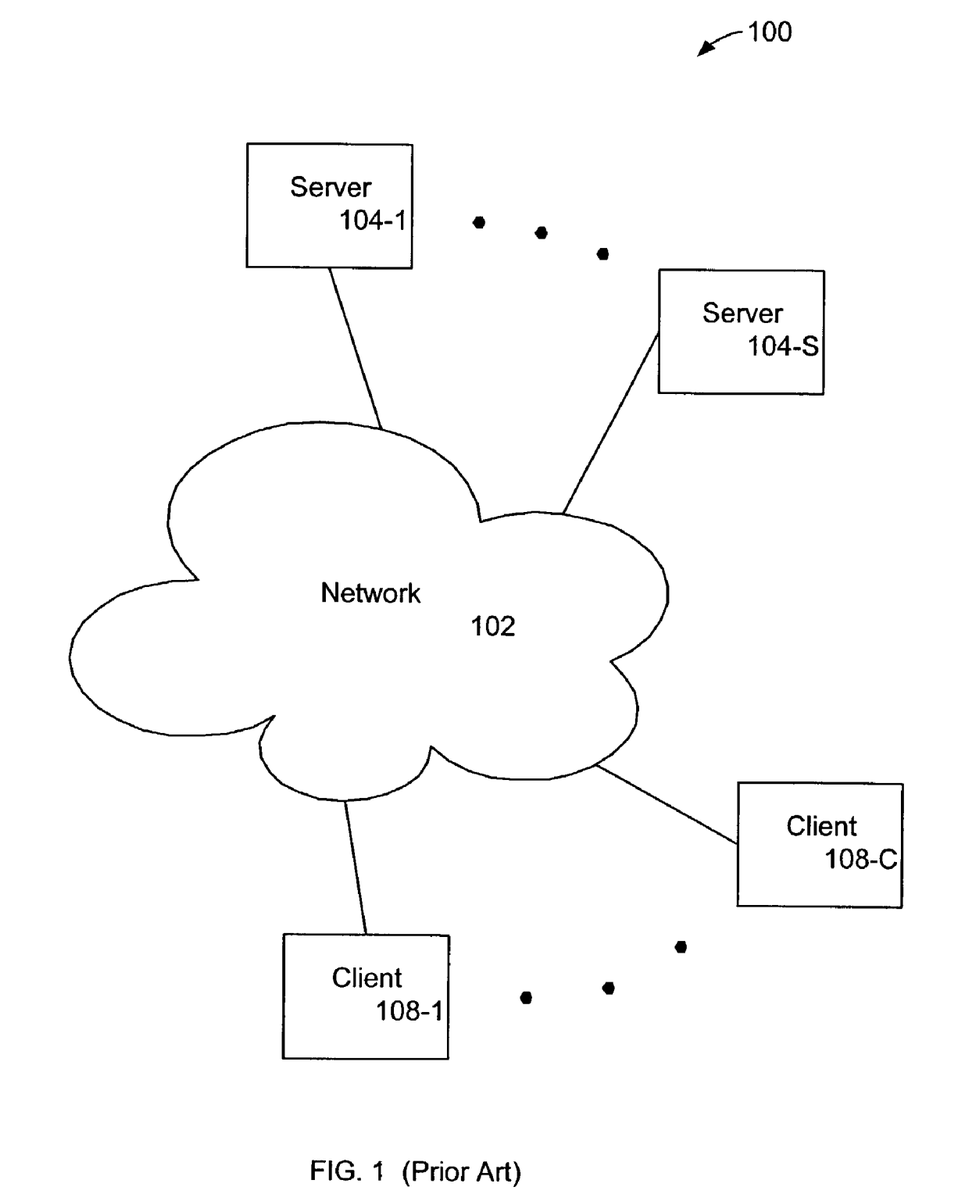
FIG. 1 illustrates a network environment in which the method and apparatus of the present invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
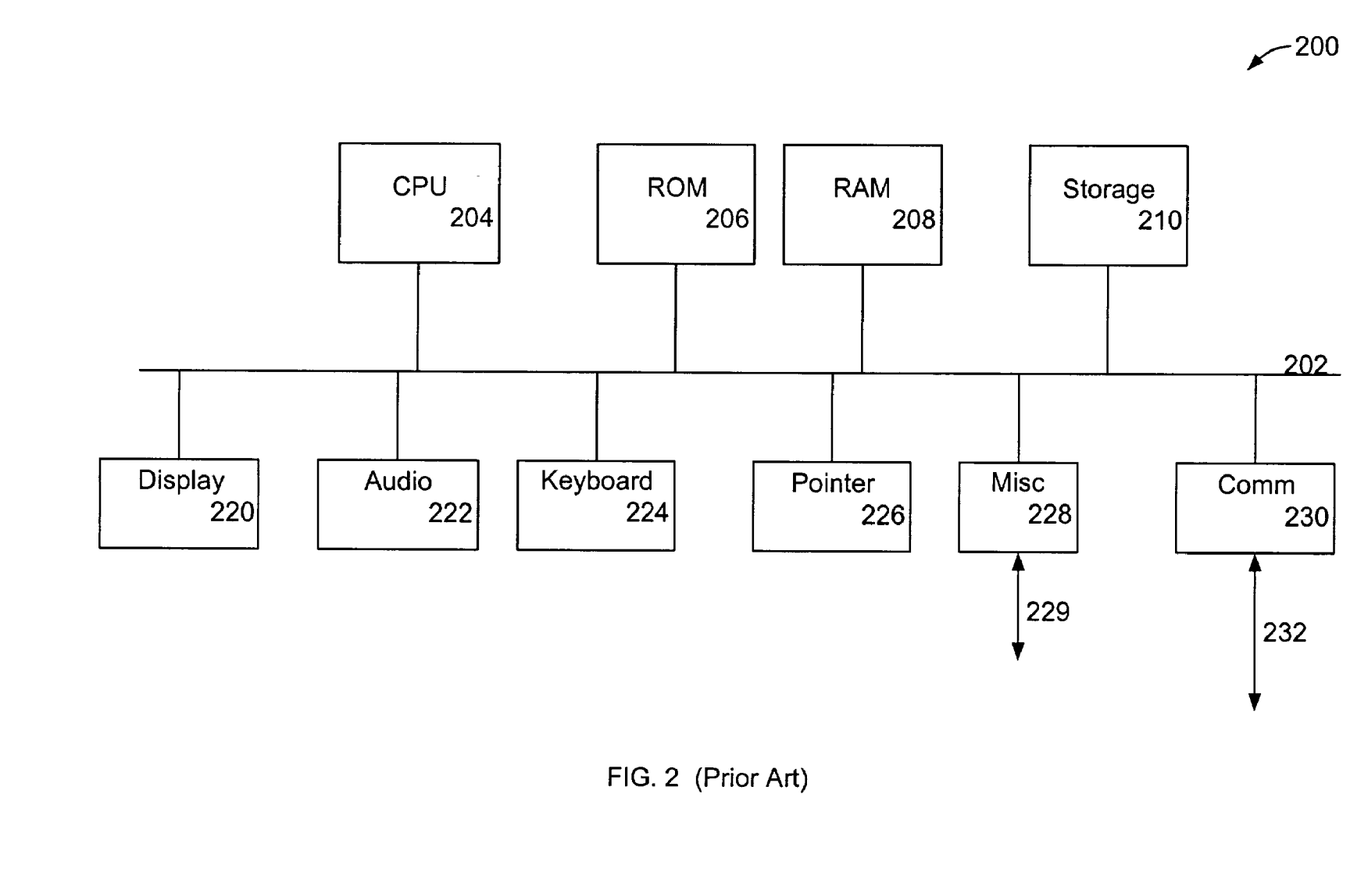
FIG. 2 is a block diagram of a computer system.

FIG. 2 illustrates a computer system 200 in block diagram form, which may be representative of any of the clients and/or servers shown in FIG. 1. More details are described below.

The present invention, in one embodiment, deals with the treatment of writes, packets, etc., in a communication system. Specifically, one embodiment of the present invention deals with the issue of when a write is considered complete and/or a packet is considered acknowledged. For convenience in describing the present invention, the discussion is restricted to writes, however one of ordinary skill in the art will appreciate that the techniques disclosed apply to packets, etc.

When an initiator (such as a processor) is connected directly to a target (such as a memory system), there is little ambiguity as to when a write is considered complete. The processor may send the write command and data to the memory, and the memory acknowledges the write command back to the processor. At this point the write data is substantially in memory and the processor has been told that the write has completed, so each party to the communication is in synchronization as to when the write occurred. This example is often referred to as a tight coupling between the processor and the memory.

When the coupling of initiators to targets is less tight, for example because the size of the system has grown and there is a communication system between the processor and the memory, the notion of a single point in time that a write is completed from all viewpoints in the system goes away. Different elements in the system may now see the write completion at different times.

Figure 3A:
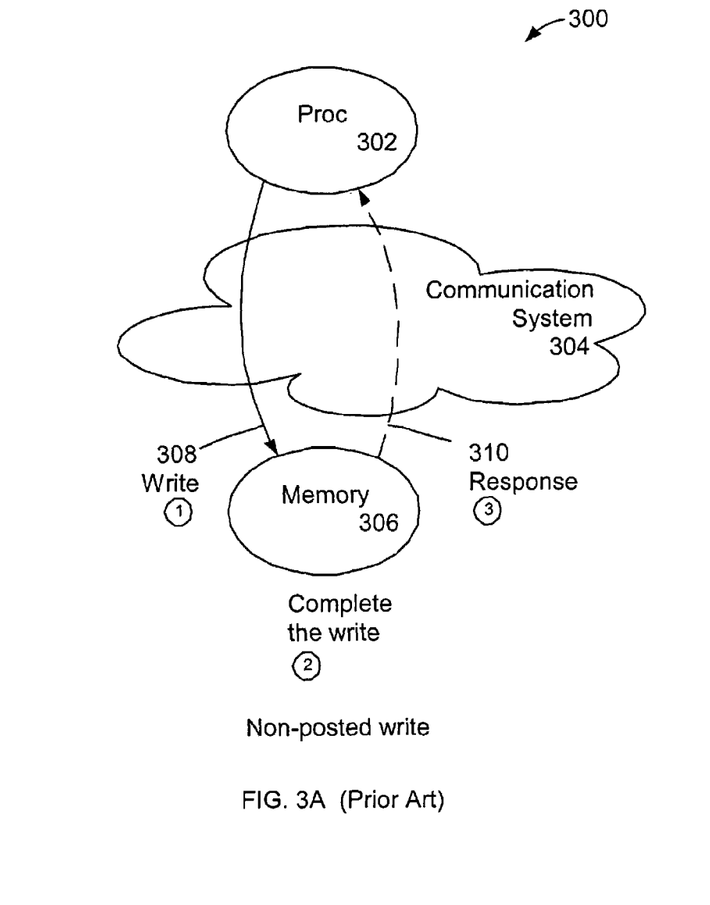
FIG. 3A and FIG. 3B illustrate a non-posted and a posted write.
Figure 3B:
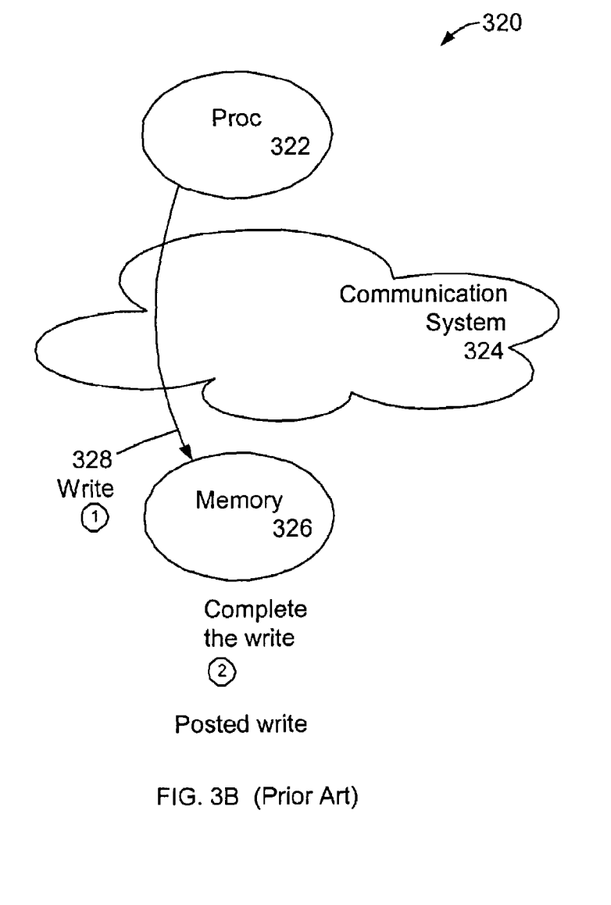

This leads to the concept of posted and non-posted writes as illustrated in FIG. 3A and FIG. 3B. A write is termed non-posted if the initiator considers the write complete only at the time that it has received confirmation of the write completion from the target. In FIG. 3A, a processor 302 sends a write command 308 through a communication system 304 to a memory 306. The memory 306 performs the write, and then responds 310 through the communication system 304 to the processor 302. The write 308 is non-posted because the processor 302 receives explicit confirmation of the write's completion (via the response 310) from the memory 306. FIG. 3B, on the other hand, shows a posted write. Here the processor 322 only sends the write 328 off to the communication system 324. The processor 322 considers the write 328 done as soon as it is transferred to the communication system 324 and does not expect a response. The memory 326 performs the write, but does not send a confirmation response. The key difference between the posted and the non-posted write is that at the time that a posted write is considered completed from the processor's viewpoint, the write may or may not have actually completed in the memory yet.

The trade-off between posted and non-posted writes involves one of performance versus accuracy. With posted writes, completion is faster (from the viewpoint of the initiator), allowing, for example, buffers to be reused and computation to continue without having to wait. However, a down-side may be that there is no longer a uniform view of when writes complete for the entire system, which complicates issues, such as, error handling and global event ordering. Depending upon system requirements, either posted or non-posted writes may make sense.

In existing communication systems, the handling of writes is usually not at the discretion of the system designer, making it difficult to do a fine trade-off between performance and accuracy for writes. In one embodiment of the present invention, a communication system allows the handling of writes to be configured so as to give the system designer fine-grained control over the performance versus accuracy trade-off. In one embodiment of the present invention, the system designer may place posting points (the points at which write requests are posted) at any point along the way from the initiator to the target.

Figure 4:
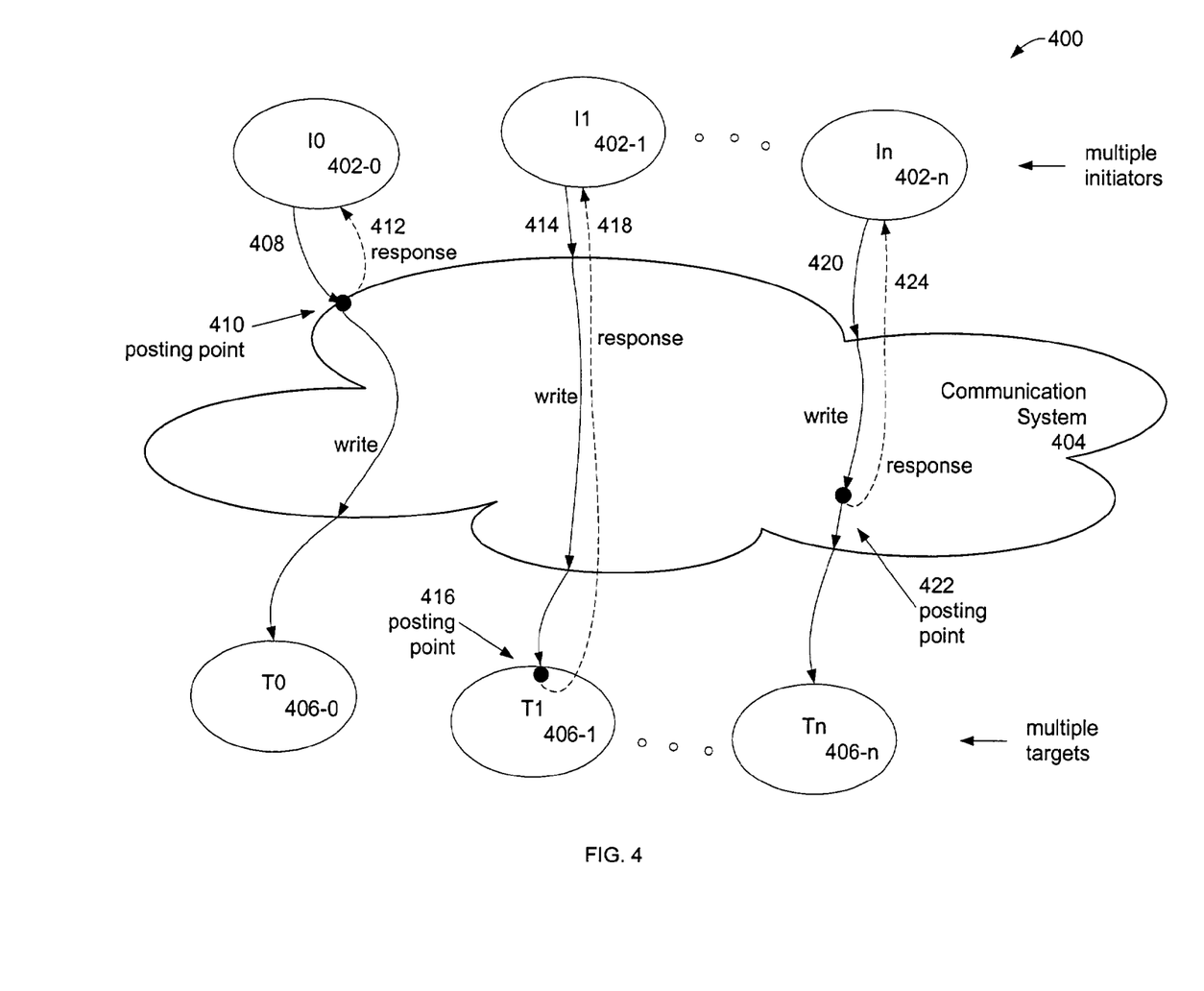
FIG. 4 illustrates one embodiment of the present invention as a communication system having different posting points.

FIG. 4 illustrates one embodiment of the present invention 400 as a communication system 404 (drawn as a cloud) that allows a set of initiators (I0, I1, . . . In) (402-0, 402-1, . . . 402-n respectively) to communicate with a set of targets (T0, T1, . . . Tn) (406-0, 406-1, . . . 406-n respectively) having different posting points (410, 416, and 422 respectively). Three examples of different posting points are shown. In each case, a write request is sent from an initiator (such as 402-0, 402-1, . . . 402-n) to a target (such as 406-0, 406-1, . . . 406-n) by way of the communication system 404. The difference in the three examples is the point at which the response is generated, referred to as the posting point. In the first example, shown in the left-most position in FIG. 4 and involving I0 402-0 and T0 406-0, the posting point 410 is right at the entrance into the communication system 404. The communication system 404 sends a response 412 back to the initiator I0 402-0 as soon as it receives the write request 408 from the initiator I0 402-0. This represents the early extreme in the spectrum of early versus late posting of a write request. The other extreme in the spectrum is represented by the example in the middle of FIG. 4 involving I1 402-1 and T1 406-1. In this case the response 418 is generated by the target T1 406-1 itself (at posting point 416 at or within T1 406-1), when it has received and processed the write 414. This makes the write 414 a non-posted write from the initiator 402-1 standpoint. The third example, shown at the right-most position in FIG. 4 involving In 402-n and Tn 406-n, shows the posting point 422 located at some intermediate location in the communication system 404. Here, the communication system 404 sends a response 424 back to the initiator In 402-n when it receives the write request 420 at the posting point 422.

In existing systems, it is typical for the posting point to be either right at the initiator (for posted writes) or at the target (for non-posted writes). In these systems, the location of the posting point is a function of the design of the initiators or targets and the system designer does not get a choice over their placement.

Thus, in one embodiment of the present invention, the posting point may be placed at any point from the one extreme of a write posted at the initiator to the other extreme of the non-posted write. By providing this ability to place the posting point, the designer and/or user may make a performance versus accuracy tradeoff.

Now, from the viewpoint of the initiator and the target, the write may be considered to have varying degrees of posting and/or non-posting. For example, in the right-most example in FIG. 4 the posting point is at 422. From the viewpoint of the initiator In 402-n the write is non-posted at point 422 because of the response 424 emanating from posting point 422 and going back to the initiator In 402-n. From the viewpoint of the target Tn 406-n, from point 422 to the target Tn 406-n the write appears as a posted write because there is no response going from the target Tn 406-n to point 422.

Thus, the posting point may be viewed from different viewpoints (perspectives) as having a posted and/or non-posted property.

Figure 5A:
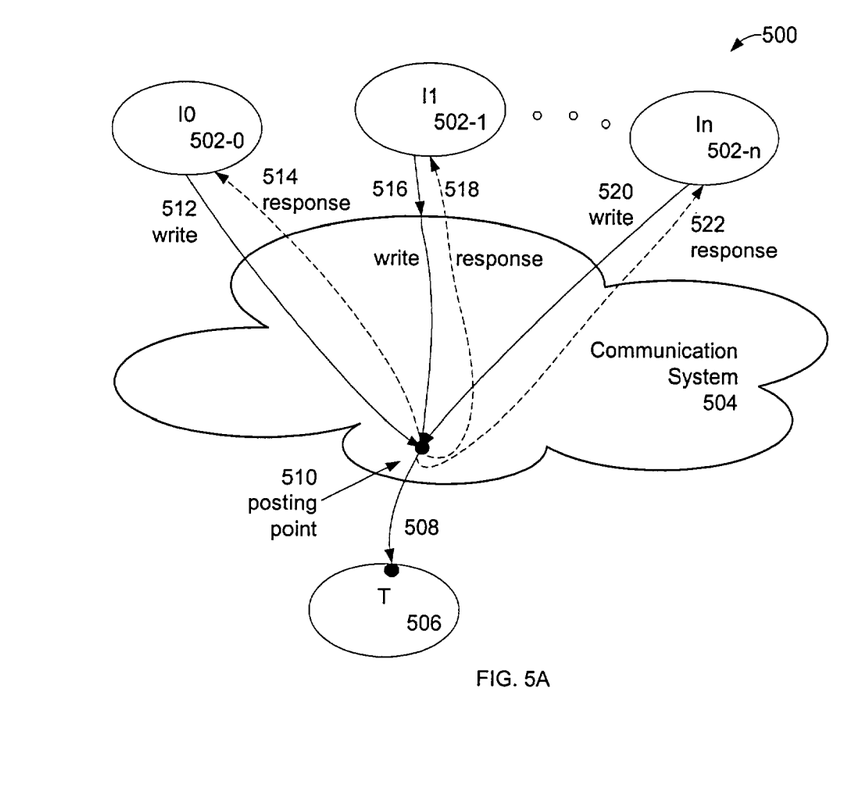
FIG. 5A and FIG. 5B illustrate embodiments of the present invention where the location of the posting point need not be the same for all initiators and targets.
Figure 5B:
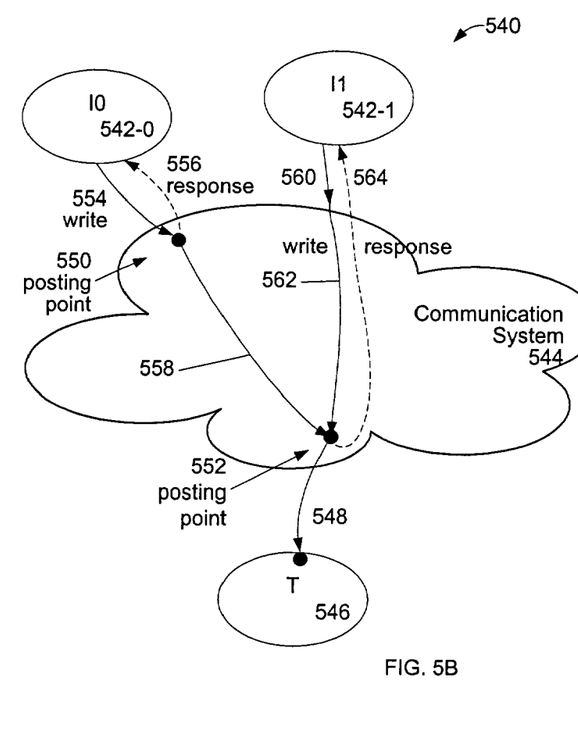

FIG. 5A and FIG. 5B illustrate embodiments of the present invention (500 and 540 respectively) where the location of the posting point need not be the same for all initiators and targets. In FIG. 5A, the posting point 510 for a particular target T 506 is located right at the point where different request streams (512, 516, and 520) from initiators I0 to In (502-0 to 502-n) converge inside the communication system 504 and are serialized for access to the target T 506. This is a convenient posting point because as long as requests are kept in order once they have been serialized, and there is no other access route into the target T 506, it is impossible to tell this posting point 510 apart from one located in the target T 506. Responses to initiators I0 to In (502-0 to 502-n respectively) from the posting point 510 are respectively 514, 518, and 522. Requests from the initiators being serialized at posting point 510 proceed in the same order as serialized over link 508 to the target T 506.

FIG. 5B illustrates different posting points for different initiators (I0 542-0 and I1 542-1) accessing a target T 546. Initiator I0 542-0 has its posting point close to the initiator I0 542-0 at posting point 550, while initiator I1 542-1 has its posting point 552 close to the target T 546. Initiator I0 542-0 may reuse resources, for example buffers, more quickly, while initiator I1 542-1 has better control over completion order of its write requests because a response 564 is originated closer to the target T 546. That is, initiator I0 542-0 sends a write 554 which gets posted at 550 and receives a response at 556 which is close to the initiator I0 542-0. After initiator I0's 542-0 write is posted at posting point 550 a write 558 goes past 552 to link 548 to the target T 546. Initiator I1 542-1 write 560 continues as 562 through the communication system 544, is posted at 552, a write continues via link 548 to target T 546. When the write 562 is posted at 552, a response 564 is sent to the initiator I1 542-1.

In one embodiment of the present invention, it is possible for the communication system to be configurable as to the location of posting points. Registers that are accessible from system software may control the posting point presence and location within the communication system. This allows system software to modify the configuration of the communication system while an application is executing, allowing it to tune the desired trade-off between performance and ordering preciseness at runtime. The posting point may be set as a static point or may be dynamically set. For example, during initial power up, a system may set various posting points and then not change them while the system is operating. These static posting points may be pre-determined and/or may be determined during the power up sequence (as for example, based upon external memory access speeds). Alternatively, the posting points may be adjusted while the system is operating. Yet another alternative is that the posting points may be determined at the time of system design and later fabricated into the system, for example, on an integrated circuit. In this "hardwired" or fabricated approach, no explicit communication or setup is required to configure a system after powering up. A combination of static and dynamic posting is also possible.

Figure 6A:
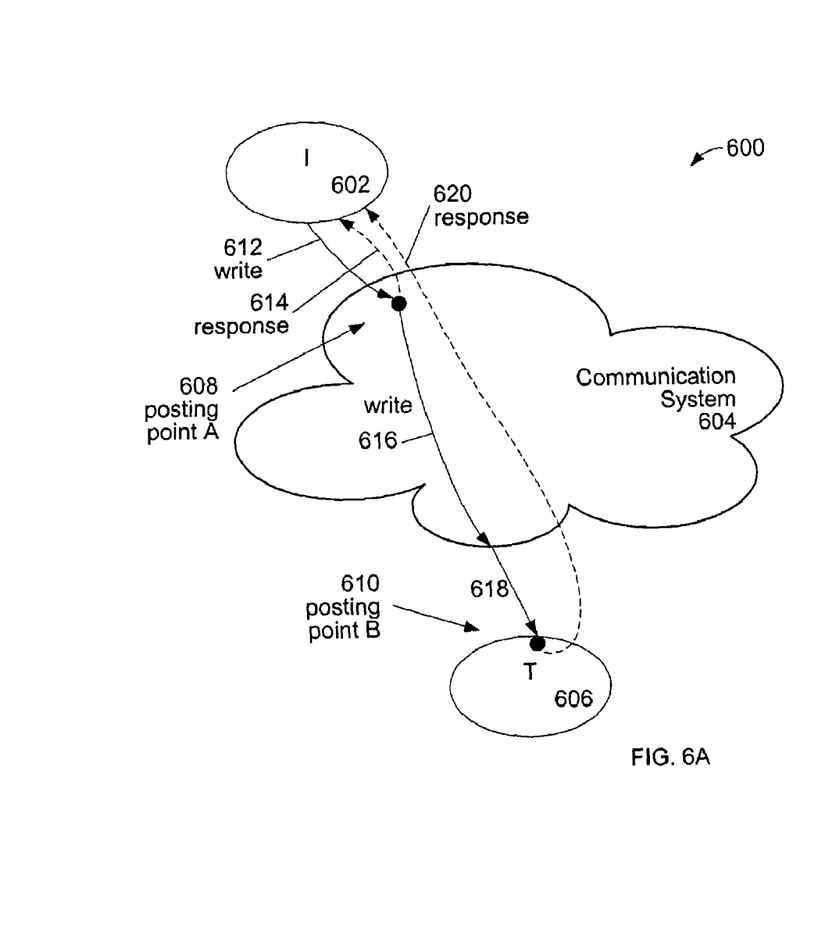
FIG. 6A and FIG. 6B illustrate embodiments of the present invention where there is a mixed burst where each request within the burst may have a different posting behavior.
Figure 6B:
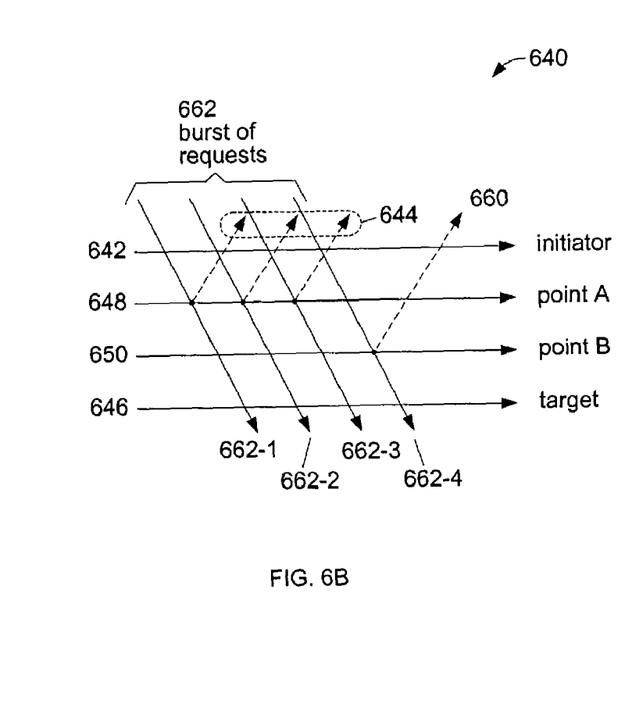

In one embodiment of the present invention, FIG. 6A and FIG. 6B illustrate (600 and 640 respectively) the notion of a mixed burst, a burst of requests where each request within the burst may have a different posting behavior. If a burst of write requests requires non-posted semantics as a burst, but there are less strict requirements for completion of individual requests within the burst, a mixed burst may achieve better performance without sacrificing ordering control for the burst. As long as the communication system retains the order of requests within the burst, it is possible to use a posting point at the target only for the last request in a burst. All previous requests can be posted close to the initiator. FIG. 6A illustrates one embodiment 600 of the present invention, showing the location of the two posting points (608 and 610). Posting point A (608) is close to the initiator I 602 and is used for all but the last request in a burst. Posting point B (610) is in the target T 606 and is used only for the last request in a burst.

For example, if a write burst consists of n requests (1, . . . , n , where 1 is the first and n is the last request), then for 1 through n-1 requests the initiator I 602 has a write 612 posted at 608 and receives back a response 614, the write continues via 616 and 618 to the target T 606. On the last request n, the initiator I 602 has a write 612 that continues via 616 and 618, is posted at 610 which is part of the target T 606, and receives back a response 620 from the target T 606.

FIG. 6B illustrates one embodiment 640 of the present invention showing the behavior of a burst 662 of 4 requests (662-1 through 662-4) over time. All 4 requests (662-1 through 662-4) proceed from initiator 642 through posting points A 648 and B 650 to the target 646. The direction of the arrows indicates how the requests/responses proceed. A request is indicated by a solid arrowed line and a response by a dashed arrowed line. The first three requests (662-1, 662-2, and 662-3) generate responses (group 644) at A 648, which results in a low latency response from the standpoint of the initiator 642. The last request 662-4 receives its response 660 from posting point B 650. Because posting point B 650 is further away from the initiator 642 (and here shown closer to the target 646), it takes longer for the response to get back to the initiator 642 than the responses (group 644) from posting point A 648.

So far, we have made use of the terms initiator and target. They define the end points for the communication: the initiator is the source of the request, and the target is where the write is ultimately performed. There may, however, be several other elements in the communication chain between the initiator and the target. In FIGS. 3A, 3B, 4, 5A, 5B, 6A, and 6B, for example, there is a communication system between the initiator and the target. The communication system itself could be made up of several communicating elements. Any connected pair of elements in the chain from initiator to target may be considered as a master and slave communicating via a point-to-point interface, with the master being the element closer to the initiator, and the slave being the element closer to the target. In one embodiment of the previous figures (FIG. 3A, FIG. 3B, FIG. 4, FIG. 5A, FIG. 5B, FIG. 6A, and FIG. 6B) a master/slave interface appears between every initiator/target and the communication system. In the case of the initiator/communication system interface, the initiator is the master and the communication system is the slave. In the case of the communication system/target interface, the communication system is the master and the target is the slave.

Figure 7A:
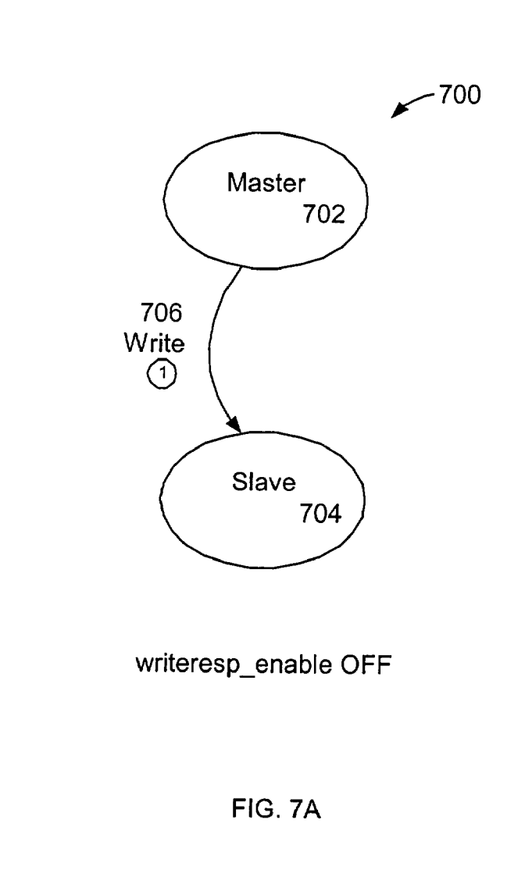
FIG. 7A, FIG. 7B, and FIG. 7C illustrate, in one embodiment of the present invention, the concept of separation of posting semantics from response phasing at the point-to-point interface between a master and a slave.
Figure 7B:
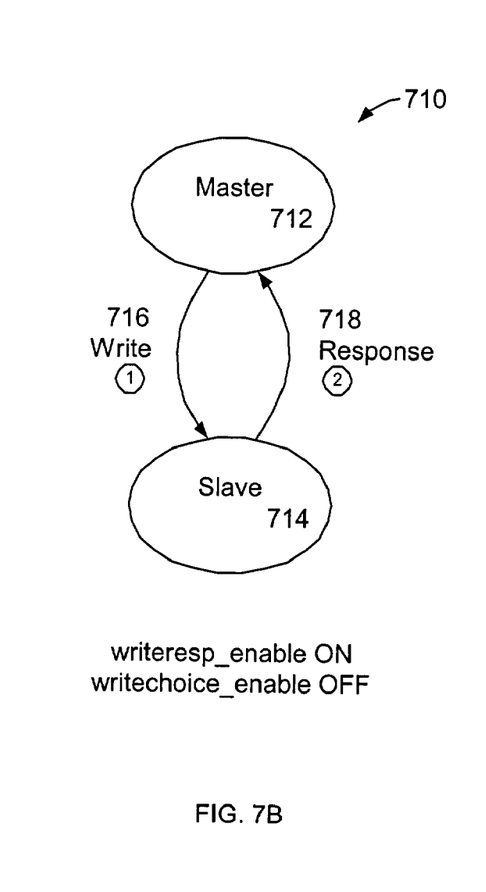
Figure 7C:
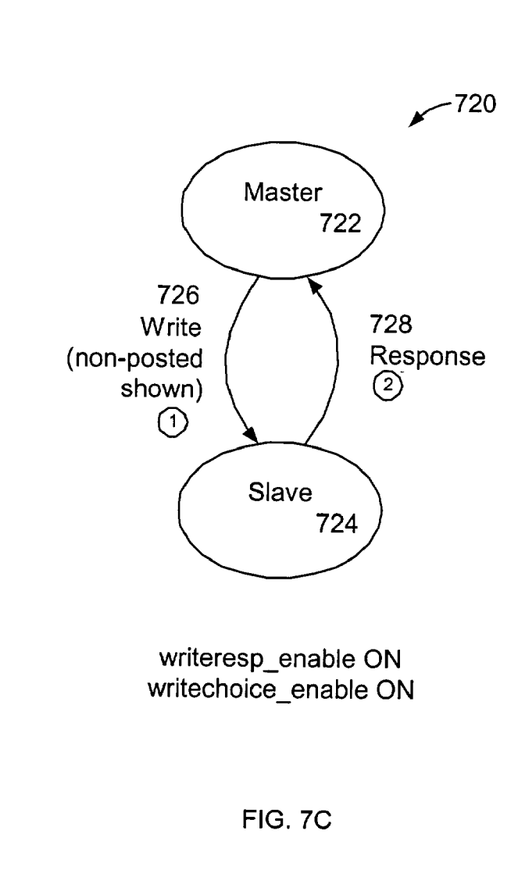

FIG. 7A, FIG. 7B, and FIG. 7C illustrate, in one embodiment (700, 710, and 720 respectively) of the present invention, the concept of separation of posting semantics from response phasing at the point-to-point interface between a master (702, 712, and 722 respectively) and a slave (704, 714, and 724 respectively). By definition, a posted write does not need a response, but may have one. A non-posted write does need a response to indicate completion of the write. However, the concept of whether write requests have responses can be separated from the concept of whether writes are posted or not. With this separation, it is possible for the slave to decide whether and how writes are posted. In particular, a communication system may decide whether and/or where writes are posted without affecting the design of the initiator. In one embodiment of the present invention, the behavior of the interface may be configured with two parameters, 1) a write response enable (denoted writeresp_enable), and 2) a write choice enable (denoted writechoice_enable). The two parameters (writeresp_enable and writechoice_enable) may each be ON or OFF independently of the other.

The parameter writeresp_enable can be ON or OFF and controls the presence of a response for writes. With writeresp_enable OFF (as illustrated in FIG. 7A), it may be preferred to have posted write semantics. As shown in FIG. 7A in embodiment 700, the master 702 issues a write 706 to the slave 704. There is no response from the slave 704 to the master 702, so this is a posted write. Note however, that it is possible for the slave not to accept the command and yet proceed to perform the write, and then to accept the command only after the actual write has been performed. This technique makes the posted write non-posted, because write acceptance in this approach now signifies completion of the write at the target.

When the parameter writeresp_enable is ON, the writechoice_enable parameter can be used to turn ON and OFF the ability for the master to explicitly communicate whether posted or non-posted write semantics are desired. When writechoice_enable is OFF (as illustrated in FIG. 7B) the master 712 can only communicate one flavor of writes 716. However, the slave 714 can decide whether and/or where those writes 716 should be posted. That is, the slave 714 can either send a response immediately (via 718), thus giving the write 716 posted semantics, or not return a response (via 718) until the write 716 has actually completed, thus giving it non-posted semantics.

Figure 8:
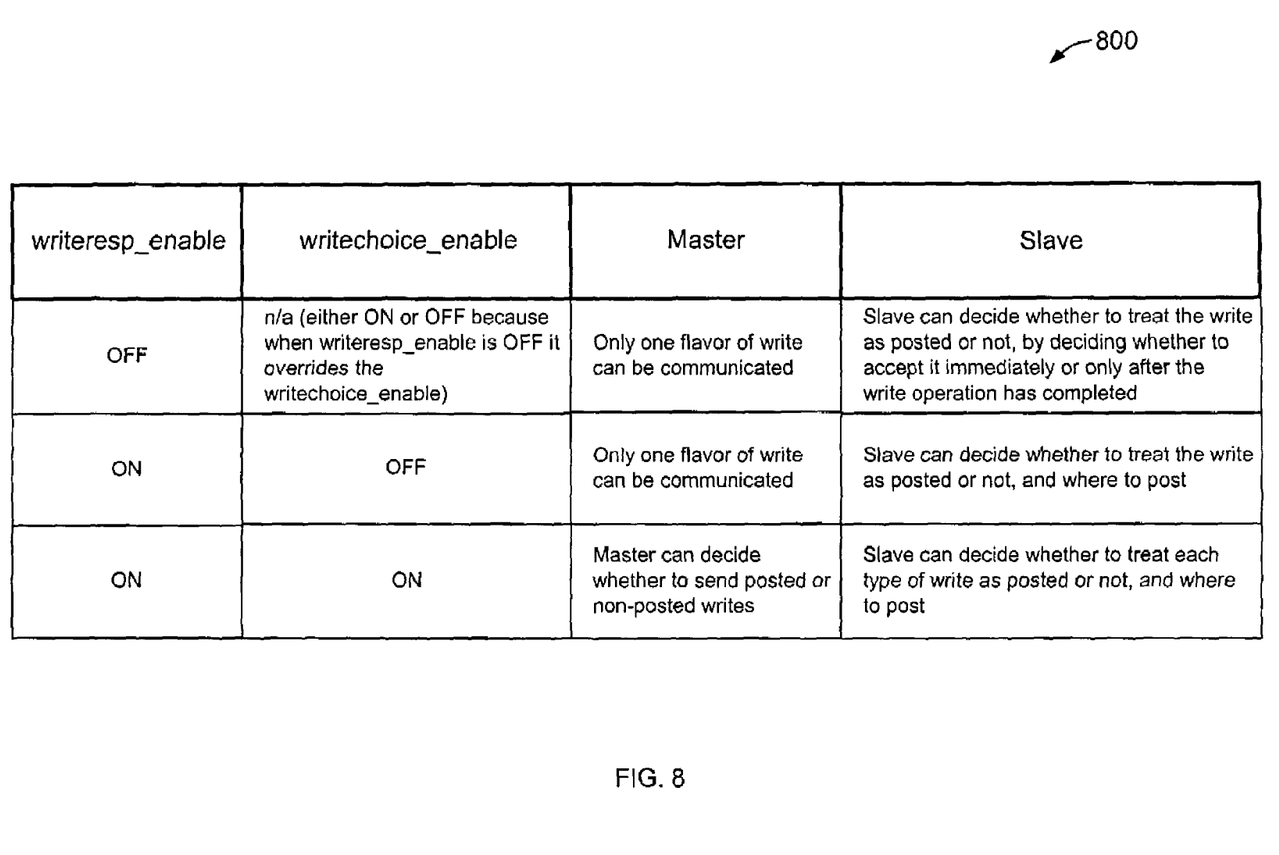
FIG. 8 summarizes parameters and their effect in one embodiment of the invention.

With writechoice_enable ON (as illustrated in FIG. 7C) the master 722 may explicitly request whether it wants a particular write request 726 to be posted or not, but the slave 724 may still decide whether to treat the write as posted or not. These options are summarized in the table in FIG. 8.

Figure 9:
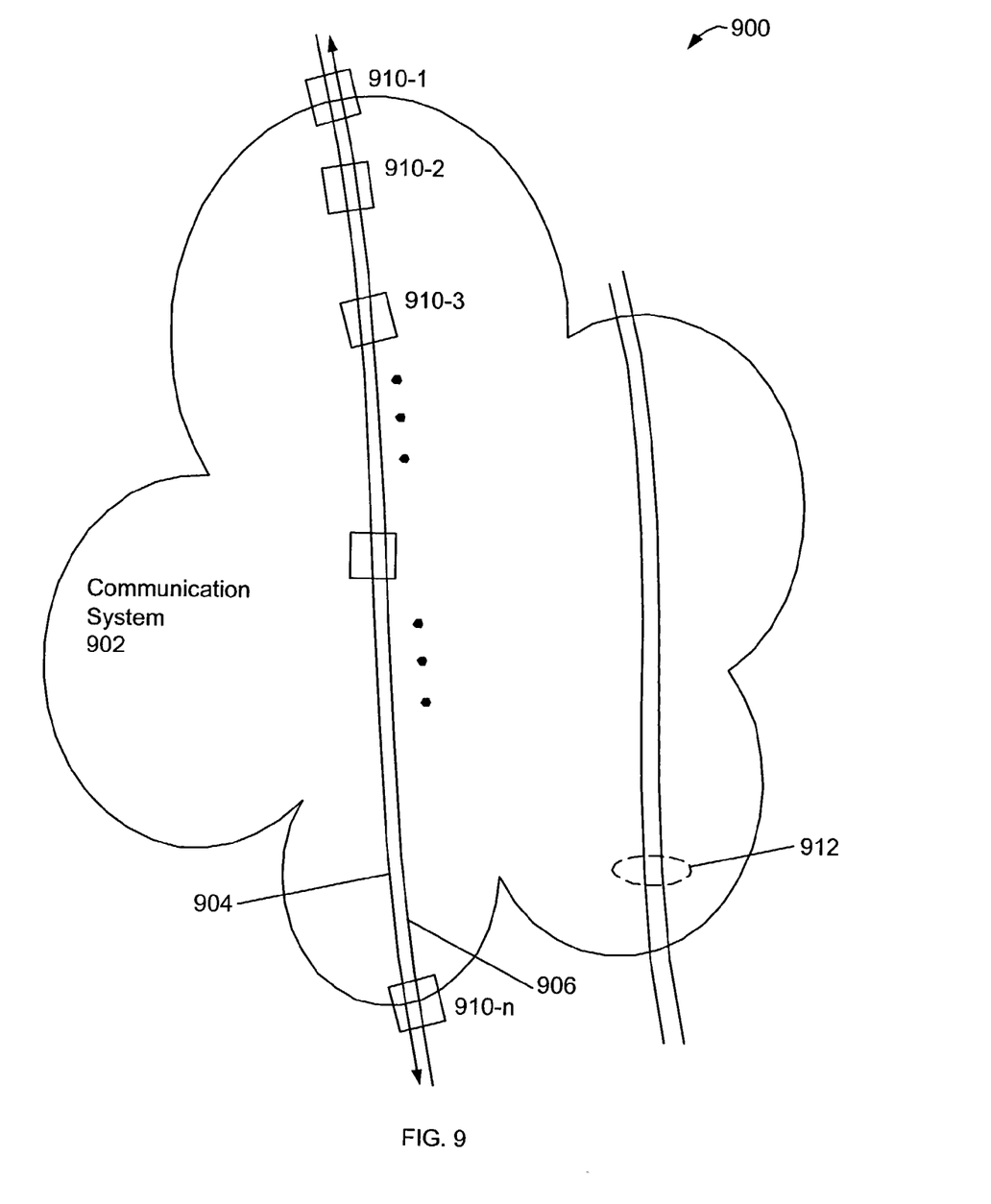
FIG. 9 illustrates one embodiment of the present invention with configurable posting points.
Figure 10:
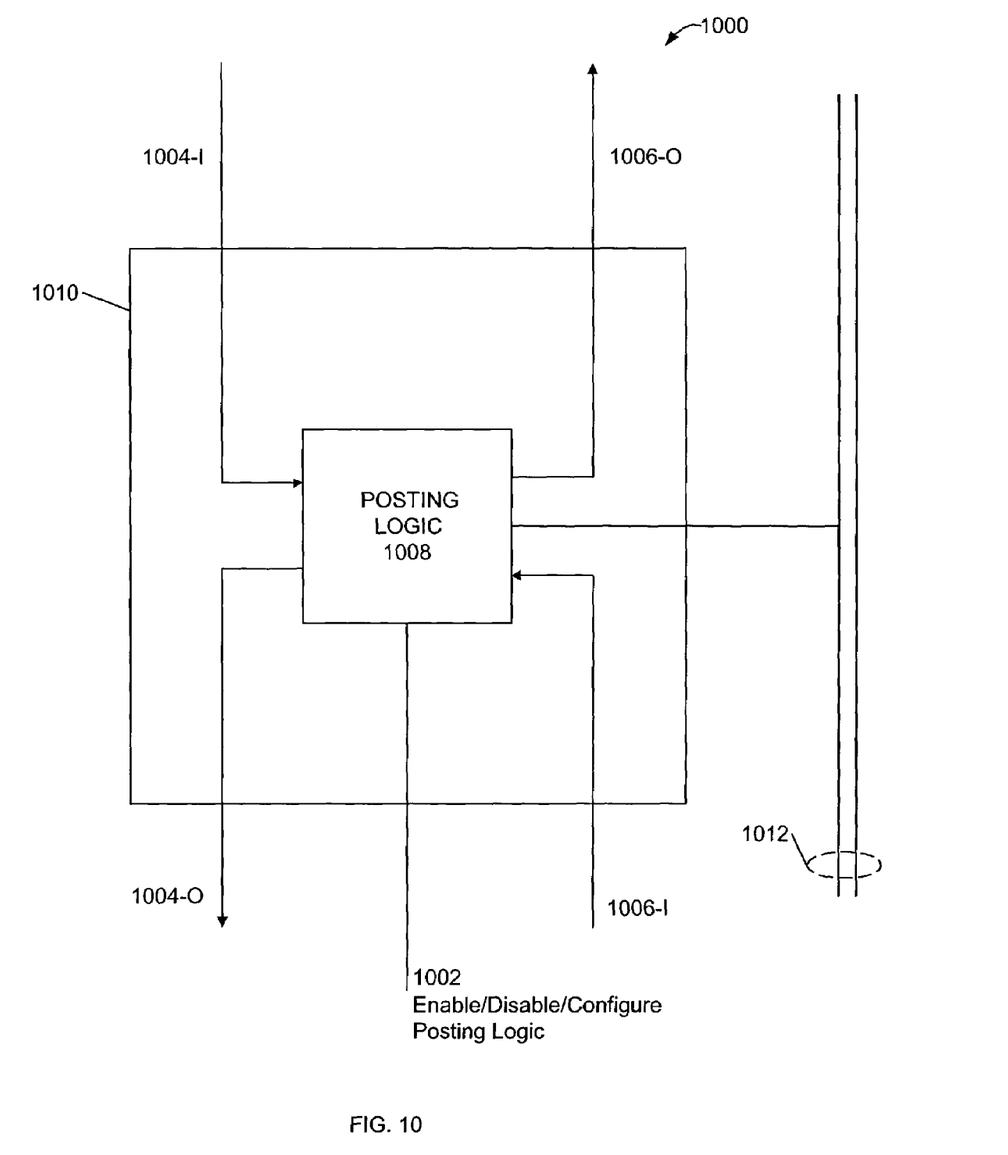
FIG. 10 illustrates more detail of a posting point for one embodiment of the present invention.

FIG. 9 and FIG. 10 illustrate one embodiment (900 and 1000 respectively) of the present invention with configurable posting points (910-1 to 910-n, and 1010 respectively). In FIG. 9, communication system 902 has a request proceeding to, for example, a target via link 904, and a possible response, returning to, for example an initiator via link 906. Throughout the communication system 902 may be possible posting points (910-1, 910-2, . . . , 910-n). It is to be appreciated that the communication system 902 may represent communication from any point to any other point in a system. For example, communication system 902 may represent a communication link between an initiator and a target. In another example, communication system 902 may represent a communication link located within an initiator, target, etc. Links 904 and 906 may be referred to as in-band, because this is the normal communication link between an initiator and a target. This may not be the only communication link and link 912 illustrates what is referred to as a side-band or out-of-band communications link.

FIG. 10 illustrates one embodiment 1000 of the present invention showing more details of a possible posting point 1010. The posting point 1010 has links 1004-I, 1004-O, 1006-I, and 1006-O capable of transferring information and communicating with posting point logic 1008. Controlling the posting logic 1008 is a signal 1002 which enables or disables posting, and can configure the posting logic. Posting logic 1008 also may communicate with out-of-band links 1012. In one embodiment, the posting logic 1008 if enabled may monitor link 1004-I and at the proper time may send a response via link 1006-O. It may pass along the signal received at 1004-I to the 1004-O link. The posting logic may then intercept a return signal on 1006-I for a response that was previously issued by the posting logic 1008. Since, the posting logic 1008 as illustrated in FIG. 10 has access to the communication links (via 1004-I, 1004-O, 1006-I, and 1006-O) it may modify communications. That is, for example, posting logic 1008 may modify a write command to make clear that it is now a posted write, or it may deal with a response coming back from the target and not pass it to the initiator if a response has already been given. Signal 1002 may originate from, for example, a control unit on a chip. One of ordinary skill in the art will appreciate that many possible variations of this one example are possible, as well as many other techniques for implementing posting points.

Thus what has been disclosed is a communication system and method with configurable posting points.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several systems in the form of S servers 104-1 through 104-S and C clients 108-1 through 108-C are connected to each other via a network 102, which may be, for example, an on-chip communication network. Note that alternatively the network 102 might be or include one or more of: inter-chip communications, an optical network, the Internet, a Local Area Network (LAN), Wide Area Network (WAN), satellite link, fiber network, cable network, or a combination of these and/or others. The servers may represent, for example: a master device on a chip; a memory; an intellectual property core, such as a microprocessor, communications interface, etc.; a disk storage system; and/or computing resources. Likewise, the clients may have computing, storage, and viewing capabilities. The method and apparatus described herein may be applied to essentially any type of communicating means or device whether local or remote, such as a LAN, a WAN, a system bus, on-chip bus, etc. It is to be further appreciated that the use of the term client and server is for clarity in specifying who initiates a communication (the client) and who responds (the server). No hierarchy is implied unless explicitly stated. Both functions may be in a single communicating device, in which case the client-server and server-client relationship may be viewed as peer-to-peer. Thus, if two devices such as 108-1 and 104-S can both initiate and respond to communications, their communication may be viewed as peer-to-peer. Likewise, communications between 104-1 and 104-S, and 108-1 and 108-C may be viewed as peer to peer if each such communicating device is capable of initiation and response to communication.

Referring back to FIG. 2, FIG. 2 illustrates a system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as an on-chip bus, a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of the system, the system may include some, all, more, or a rearrangement of components in the block diagram. For example, an on-chip communications system on an integrated circuit may lack a display 220, keyboard 224, and a pointer 226. Another example may be a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "communicating" or "displaying" or the like, can refer to the action and processes of a computer system, or an electronic device, that manipulates and transforms data represented as physical (electronic) quantities within the electronic device or computer system's registers and memories into other data similarly represented as physical quantities within the electronic device and/or computer system memories or registers or other such information storage, transmission, or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), digital versatile disk (DVD), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network. This communications network is not limited by size, and may range from, for example, on-chip communications to WANs such as the Internet.

The methods of the invention may be implemented using computer software. If written in a programming language conforming to a recognized standard, sequences of instructions designed to implement the methods can be compiled for execution on a variety of hardware platforms and for interface to a variety of operating systems. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical, or other form of propagated signals (e.g., carrier waves, infrared signals, digital signals, etc.); etc.

Thus, a communication system and method with configurable posting points have been described.

What is claimed is:

1. A method, comprising:
setting a posting point that controls a programmable amount of delay between an issued request and a generated response at any location in a communication system;
sending the response associated with the posting point;
configuring a mode of operation for a plurality of initiators;
configuring a mode of operation for a plurality of targets; and
communicating with a plurality of groups of initiators and targets, wherein a communication within a particular group between a particular initiator communicating with a particular target is determined by a configured mode of operation for that particular initiator and that particular target, wherein the configured mode of operation is determined by a response control to determine whether a response occurs and a separate posting control to determine whether posting occurs and the location in the system that the posting occurs.

2. The method of claim 1 wherein setting of the posting point further comprises configuring the amount of delay element selected from the group consisting of: an initiator, a master, an interconnect, a second communication system, the communication system, a target, and a slave.

3. The method of claim 1 wherein setting the posting point is setting a posting point when the communication system is fabricated.

4. The method of claim 1 wherein setting the posting point is statically set in the communication system.

5. The method of claim 1 wherein setting the posting point is dynamically set at any time during the operation of the communication system.

6. The method of claim 1 wherein the posting point depends upon a position of a request in a burst.

7. The method of claim 1 wherein the posting point is statically set during a first time period and dynamically set during a second time period in the communication system.

8. The method of claim 1 wherein the posting point is for a write request operation.

9. The method of claim 8 further comprising a mixed write burst.

10. The method of claim 9 wherein the posting point is configurable in position and the writes in the burst may be individually configured as a posted or a non-posted write.

11. The method of claim 1 wherein the posting point is a plurality of posting points and each individual posting point may be set on a basis selected from the group consisting of: a per-initiator basis, a per-target basis, a per-logic section basis, a subsystem basis, and a global basis.

12. A processing system comprising a processor, which when executing a set of instructions performs the method of claim 1.

13. A machine-readable medium having stored thereon instructions, which when executed by the machine, to cause the machine to perform the method of claim 1.

14. The method of claim 1 further comprising:
communicating a write response enable signal; and
communicating a write choice signal.

15. The method of claim 14 wherein when the write response enable signal is deasserted a master communicates a write command.

16. The method of claim 15 wherein a slave by accepting the write command without delay treats a write as posted.

17. The method of claim 15 wherein the slave by completing a write operation before accepting the write command treats the write command as non-posted.

18. The method of claim 14 wherein when the write response enable signal is asserted and the write choice enable signal is deasserted a master communicates a write command.

19. The method of claim 18 wherein a slave may treat the write command as having a parameter selected from the group consisting of: posted, and non-posted.

20. The method of claim 19 wherein the write command is treated as posted and further comprising the slave setting a post point.

21. The method of claim 14 wherein when the write response enable signal is asserted and the write choice enable signal is asserted a master communicates a write command selected from the group consisting of: posted, and non-posted.

22. The method of claim 21 wherein a slave may treat the write command as having a parameter selected from the group consisting: of posted, and non-posted.

23. The method of claim 22 wherein the write command is treated as posted and further comprising the slave setting a post point.

24. The method of claim 14 wherein the communicating sets a configuration for an element selected from the group consisting of: a master, and a slave.

25. The method of claim 24 wherein the communicating occurs at a point in time selected from the group consisting of: at time of fabrication of the master, at time of fabrication of the slave, at a power up, at a reset, at an initialization prior to normal operation for the element, and dynamically during normal operation for the element.

26. An apparatus, comprising:
an initiator having an input and an output;
a communication system having an input, and an output, the input coupled to receive the initiator output, the output coupled to transmit to the initiator input;
a plurality of initiators each having a configurable mode of operation;
a plurality of targets each having a configurable mode of operation; and
a plurality of groups of initiators and targets, each group having at least one interface for communicating within the group, wherein a communication within a particular group between a particular initiator communicating with a particular target is determined by a configured mode of operation for that particular initiator and that particular target, wherein the configured mode of operation is determined by a response control to determine whether a response occurs and a separate posting control to determine whether posting occurs and the location in the system that the posting occurs, wherein the communication system further comprises one or more posting points that control a programmable amount of delay between an issued request and a generated response at any location in the communication system.

27. The apparatus of claim 26 wherein a register to establish the one or more posting points is coupled to the communication system.

28. The apparatus of claim 27 wherein the coupling to the communication system is to a link selected from the group consisting of: the communication system input, the communication system output, a communication system second input, and a communication system second output.

29. The apparatus of claim 28 wherein the coupling to the link is a coupling at any position on the link.

30. A machine-readable medium having stored thereon information including data and instructions, which when executed by the machine to cause the machine to generate a representation of the apparatus of claim 26.

31. The apparatus of claim 26 further comprising:
the communication system having a second input, and a second output,
a target having an input and an output, the input coupled to receive the communication system second output, and the output coupled to transmit to the communication system second input.

32. The apparatus of claim 26 further comprising:
a master having a plurality of inputs and an output, one of the plurality of inputs coupled to receive a write response enable signal, one of the plurality of inputs coupled to receive a write choice signal, one of the plurality of inputs coupled to receive a write command response, and the output coupled to transmit a write command; and
a slave having a plurality of inputs and an output, one of the plurality of inputs coupled to receive a write response enable signal, one of the plurality of inputs coupled to receive a write choice signal, one of the plurality of inputs coupled to receive the write command, and the output coupled to transmit the write command response.

33. The apparatus of claim 32 further comprising an apparatus for determining from the state of the response enable signal, and the state of the write choice signal a master operation selected from the group consisting of: a posted write, a non-posted write, a write after a response, a write before a response, a posting point operation, and creating a posting point.

34. The apparatus of claim 32 further comprising an apparatus for determining from the state of the response enable signal, and the state of the write choice signal a slave operation selected from the group consisting of: a posted write, a non-posted write, a write after a response, a write before a response, a posting point operation, and creating a posting point.

35. An apparatus, comprising:
a target having an input and an output;
a communication system having an input, and an output, the input coupled to receive the target output, the output coupled to transmit to the target input;
a plurality of initiators each having a configurable mode of operation;

a plurality of targets each having a configurable mode of operation; and a plurality of groups of initiators and targets, each group having at least one interface for communicating within the group, wherein a communication within a particular group between a particular initiator communicating with a particular target is determined by a configured mode of operation for that particular initiator and that particular target, wherein the configured mode of operation is determined by a response control to determine whether a response occurs and a separate posting control to determine whether posting occurs and the location in the system that the posting occurs, wherein the communication system further comprises one or more posting points that control a programmable amount of delay between an issued request and a generated response at any location in the communication system.

36. The apparatus of claim 35 wherein logic to establish the one or more posted points is coupled to the communication system.

37. The apparatus of claim 36 wherein the coupling to the communication system is to a link selected from the group consisting of: the communication system input, the communication system output, a communication system second input, and a communication system second output.

38. The apparatus of claim 37 wherein the coupling to the link is a coupling at any position on the link.

39. A machine-readable medium having stored thereon information including data and instructions, which when executed by the machine to cause the machine to generate a representation of the apparatus of claim 35.

40. An apparatus, comprising:
means for setting a posting point that controls a programmable amount of delay between an issued request and a generated response at any location in a communication system;
means for sending the response associated with the posting point;
means for configuring a mode of operation for a plurality of initiators;
means for configuring a mode of operation for a plurality of targets; and
means for communicating with a plurality of groups of initiators and targets, wherein a communication within a particular group between a particular initiator communicating with a particular target is determined by a configured mode of operation for that particular initiator and that particular target, wherein the configured mode of operation is determined by a response control to determine whether a response occurs and a separate posting control to determine whether posting occurs and the location in the system that the posting occurs.

41. The apparatus of claim 40 further comprising means for setting the posting point at a time the communication system is created.

42. The apparatus of claim 40 further comprising means for setting the posting point statically.

43. The apparatus of claim 40 further comprising means for setting the posting point dynamically.

44. A machine-readable medium having stored thereon information including data and instructions, which when executed by the machine to cause the machine to generate a representation of the apparatus of claim 40.

45. The apparatus of claim 40 further comprising:
means for receiving a write response enable signal; and
means for receiving a write choice signal.

46. The apparatus of claim 45 further comprising means for determining from the state of the response enable signal, and the state of the write choice signal a slave operation selected from the group consisting of: a posted write, a non-posted write, a write after a response, a write before a response, a posting point operation, and creating a posting point.

47. A system comprising circuitry, which when operating, performs the following:
receives an input signal; and
transfers the input signal to a posting point that controls a programmable amount of delay between the input signal and a generated output signal at any location in the system, wherein the system further comprises:
a plurality of initiators each having a configurable mode of operation;
a plurality of targets each having a configurable mode of operation; and
a plurality of groups of initiators and targets, each group having at least one interface for communicating within the group, wherein a communication within a particular group between a particular initiator communicating with a particular target is determined by a configured mode of operation for that particular initiator and that particular target, wherein the configured mode of operation is determined by a response control to determine whether a response occurs and a separate posting control to determine whether posting occurs and the location in the system that the posting occurs.

48. The system of claim 47 further comprising a master having an output, the output coupled to transmit the input signal.

49. The system of claim 47 further comprising transferring the input signal to an output, and a slave having an input, the input coupled to receive the output.

50. The system of claim 47 further comprising transferring a payment and/or a credit.

51. The system of claim 47 wherein each initiator comprises a master and each target comprises a slave.

52. The system of claim 51 wherein the communication within a particular group is determined by the configured mode of operation for each master and each slave.

53. The system of claim 52 wherein the mode of operation is determined by a write response enable value, and a write choice value.

54. The system of claim 53 wherein the mode of operation for a specific master is selected from the group consisting of: only one flavor of write communicated, and master can decide to send a posted or a non-posted write.

55. The system of claim 53 wherein the mode of operation for a specific slave is selected from the group consisting of: slave can decide to treat a write as posted or as non-posted; slave can decide to treat a write as posted or as not posted, and where to post a write; and slave can decide how to treat a write, and where to post a write.

56. The system of claim 51 wherein the mode of operation is determined by a write response enable value, and a write choice value and when:
the write response enable value is deasserted and the write choice value is asserted or deasserted:
the master communicates a write command; and
the slave may treat the write command as posted by accepting the write command without delay, or as non-posted by completing a write operation before accepting the write command;
the write response enable value is asserted and the write choice enable value is deasserted:

the master communicates a write command; and the slave may treat the write command as non-posted by not setting a post point, or as posted by setting a post point;

the write response enable value is asserted and the write choice enable value is asserted:

the master communicates a posted write command, or a non-posted write command; and the slave may treat the posted or non-posted write command as non-posted by not setting a post point, or as posted by setting a post point.

57. A method for in-place configuration of a posting point, the method comprising:

inputting a signal for configuration;

transforming the signal for configuration into a posting point command;

transmitting the posting point command to the posting point;

receiving the posting point command at the posting point;

executing the received posting point command;

configuring a mode of operation for a plurality of initiators; configuring a mode of operation for a plurality of targets; and communicating with a plurality of groups of initiators and targets, wherein a communication within a particular group between a particular initiator communicating with a particular target is determined by a configured mode of operation for that particular initiator and that particular target, wherein the configured mode of operation is determined by a response control to determine whether a response occurs and a separate posting control to determine whether posting occurs and the location in the system that the posting occurs.

58. The method of claim 57 wherein transforming the signal to the posting point commands comprises using a look up table.

59. The method of claim 57 wherein the signal for configuration is determined at initialization.

60. The method of claim 57 further comprising maintaining a record of any previous posting point commands.

61. A method, comprising:

determining a location for a posting point that controls a programmable amount of delay between an issued request and a generated response at any location in a communication system;

configuring the communication system to have the posting point at the determined location;

configuring a mode of operation for a plurality of initiators;

configuring a mode of operation for a plurality of targets; and communicating with a plurality of groups of initiators and targets, wherein a communication within a particular group between a particular initiator communicating with a particular target is determined by a configured mode of operation for that particular initiator and that particular target, wherein the configured mode of operation is determined by a response control to determine whether a response occurs and a separate posting control to determine whether posting occurs and the location in the system that the posting occurs.

62. The method of claim 61 further comprising maintaining a record of any previous configuration.

63. The method of claim 61 wherein the configuring is performed when the communication system is, produced.

* * * * *